US006643527B2

(12) United States Patent
Satoh et al.

(10) Patent No.: US 6,643,527 B2
(45) Date of Patent: *Nov. 4, 2003

(54) POWER SWITCHING UNIT OF A PORTABLE TELEPHONE CAPABLE OF MONITORING AND CONTROLLING A BATTERY SUPPLY VOLTAGE THEREOF

(75) Inventors: Kazuhiro Satoh, Kawasaki (JP); Hiroyuki Nagatani, Kawasaki (JP); Masahiro Aota, Sendai (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,619

(22) Filed: Nov. 3, 1997

(65) Prior Publication Data

US 2002/0028701 A1 Mar. 7, 2002

Related U.S. Application Data

(63) Continuation of application No. 08/520,731, filed on Aug. 29, 1995, now abandoned, which is a continuation of application No. 08/025,331, filed on Feb. 24, 1993, now abandoned.

(30) Foreign Application Priority Data

Feb. 27, 1992 (JP) ............................... 4-041677
Mar. 9, 1992 (JP) ............................... 4-050179

(51) Int. Cl.[7] ................................. H04Q 7/32

(52) U.S. Cl. ...................... 455/574; 455/343

(58) Field of Search ................ 455/574, 573, 455/572, 575, 556, 127, 343

(56) References Cited

U.S. PATENT DOCUMENTS

| 4,761,824 A | * | 8/1988 | Saito ........................... 455/127 |
| 4,982,443 A | * | 1/1991 | Komoda ..................... 455/343 |
| 5,046,136 A | * | 9/1991 | Tokunaga et al. ........... 455/127 |
| 5,086,509 A | * | 2/1992 | Inubushi et al. .............. 455/89 |
| 5,117,449 A | * | 5/1992 | Metroka et al. .............. 379/58 |
| 5,239,694 A | * | 8/1993 | Toyoshima .................. 455/127 |
| 5,265,271 A | * | 11/1993 | Marko et al. ................ 455/343 |
| 5,303,288 A | * | 4/1994 | Duffy et al. .................. 379/59 |

FOREIGN PATENT DOCUMENTS

| JP | 55-76644 | | 5/1980 | |
| JP | 58-29327 | | 2/1983 | |
| JP | 61-15846 | | 1/1986 | |
| JP | 63-180197 | | 7/1988 | |
| JP | 64-55625 | | 3/1989 | |
| JP | 2154539 | * | 6/1990 | ................ 455/38.3 |
| JP | 3-171934 | | 7/1991 | |
| JP | 4-342319 | | 11/1992 | |

* cited by examiner

Primary Examiner—William Trost
Assistant Examiner—Philip J. Sobutka
(74) Attorney, Agent, or Firm—Armstrong, Westerman & Hattori, LLP

(57) ABSTRACT

A power switching unit of a portable telephone which has a function of storing data such as telephone numbers and operates with a battery. The unit comprises a battery for supplying power to a radio unit and a control unit which contains a data storage function and controls operation of the radio unit, first voltage monitor means for monitoring a supply voltage of the battery to output a first voltage drop signal when the supply voltage falls below a first predetermined value, and communication disconnection means for stopping power supply to the radio unit upon reception of the first voltage drop signal. The power switching unit of the portable telephone further includes voltage adjustment means for adjusting voltage suppled to the control unit from the battery to a predetermined operating voltage of the control unit for supplying it to the control unit.

3 Claims, 11 Drawing Sheets

POWER SWITCHING UNIT OF A PORTABLE TELEPHONE CAPABLE OF MONITORING AND CONTROLLING A BATTERY SUPPLY VOLTAGE THEREOF

This application is a Continuation of application Ser. No. 08/520,731 filed Aug. 29, 1995, now abandoned; which is a Continuation of application Ser. No. 08/025,331 filed on Feb. 24, 1993, now abandoned.

BACKGROUND OF THE INVENTION

(1) Field of the Invention

This invention relates to a power switching unit of a portable telephone operated with a battery and more particularly to a power switching unit of a portable telephone having a storage function of data such as telephone numbers.

(2) Description of the Related Art

Recently, as the demand for mobile communication has increased, high functions and high performance as well as a simple radiotelephone function are required for a portable telephone.

One of the high functions is a storage function which enables the portable telephone to store data such as telephone numbers and names for reading out the data. This function is called "electronic pocket notebook function" in this specification.

With such a portable telephone, if the output voltage of an internal battery falls below the threshold voltage required for a radio unit to operate at the minimum, power supply from the battery is shut off to stop all functions of the portable telephone in order to prevent the radio unit from operating abnormally.

In such a portable telephone, the electronic pocket notebook function section consumes much less power than the communication function section. If the battery output voltage drops and operation of the communication function becomes impossible, often the electronic pocket notebook function can be used. Formerly, however, when the battery output voltage dropped, power supply was stopped not only to the communication function section, but also to the electronic pocket notebook function section. Thus, the electronic pocket notebook function as well as the communication function became unavailable.

SUMMARY OF THE INVENTION

Accordingly, it is an object of the invention to provide a power switching unit of a portable telephone having a data storage function such as an electronic pocket notebook function that can be used even if a supply voltage from a battery drops.

To the end, according to a first embodiment of the invention, there is provided a power switching unit of a portable telephone comprising a radio unit and a control unit which contains a data storage function and controls operation of the radio unit, the power switching unit comprising:

a battery for supplying power to the control unit and the radio unit;

first voltage monitor means for monitoring a supply voltage of the battery to output a first voltage drop signal when the supply voltage falls below a first predetermined value; and communication disconnection means for stopping power supply to the radio unit upon reception of the first voltage drop signal.

The power switching unit of the portable telephone further includes voltage adjustment means for adjusting the voltage suppled to the control unit from said battery to a predetermined operating voltage of the control unit for supplying it to the control unit.

According to a second embodiment of the invention, there is provided a power switching unit of a portable telephone comprising a radio unit and a control unit which contains a data storage function and controls operation of the radio unit, the power switching unit comprising:

a first battery for supplying power to the control unit;

a second battery normally for supplying power to the radio unit;

first voltage monitor means for always monitoring a supply voltage of the first battery to output a first voltage drop signal when the supply voltage of the first battery falls below a first predetermined value;

power supply instruction means for outputting a power supply instruction signal upon reception of the first voltage drop signal;

power supply means for supplying power to the control unit from the second battery upon reception of the power supply instruction signal;

second voltage monitor means for always monitoring a supply voltage of the second battery to output a second voltage drop signal when the supply voltage of the second battery falls below a second predetermined value;

power disconnection instruction means for outputting a power disconnection signal upon reception of the second voltage drop signal; and power disconnection means for stopping power supply to the radio unit from the second battery upon reception of the power disconnection signal.

If the voltage supplied from the battery drops, power supply to the radio unit is shut off, but power supply to the control unit having the data storage function is continued, so that the user can use only the data storage function such as the electronic pocket notebook function.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Referring now to the accompanying drawings, there are shown embodiments of the invention.

Figure 1:
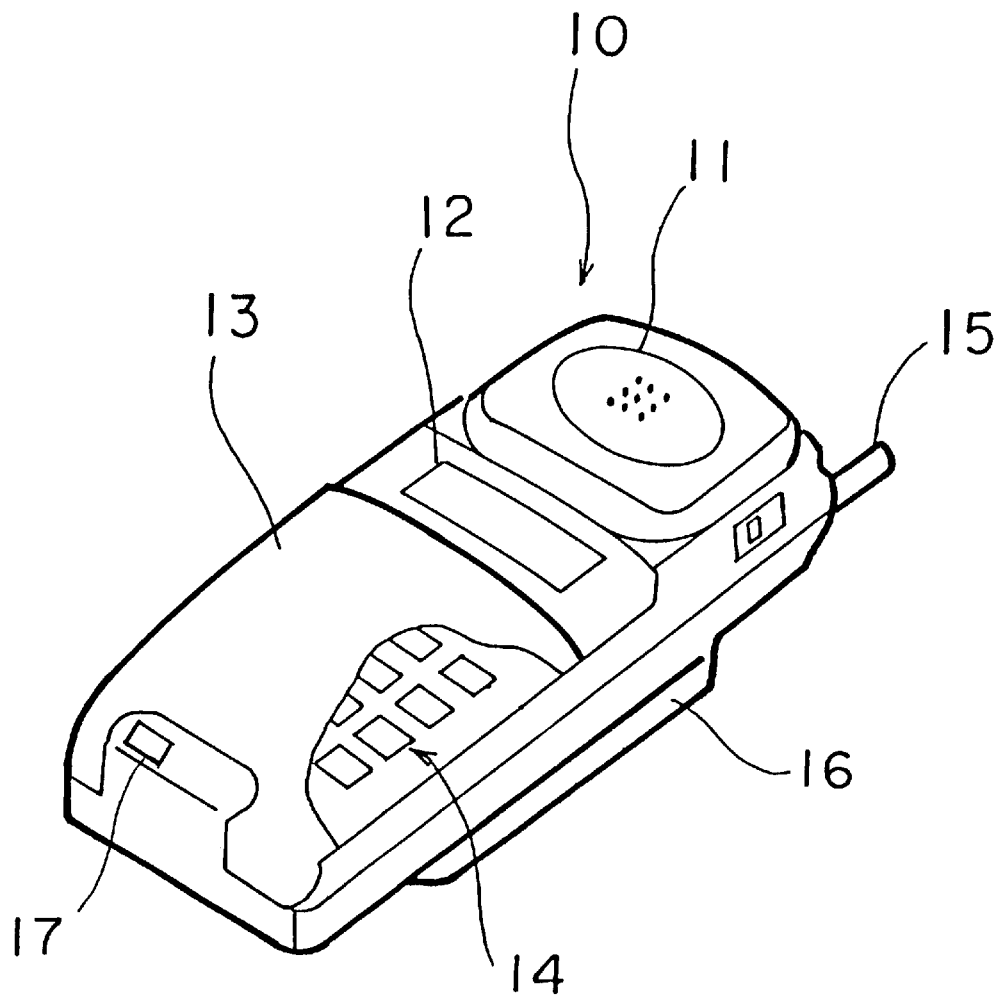
FIG. 1 is an external view of a portable telephone according to the invention.

FIG. 1 is an external view of a portable telephone according to the invention. A loudspeaker 11, a display section 12, an open cover 13, and a microphone 17 are provided on the top of the portable telephone 10. The display section 12 displays telephone numbers and names previously stored as a telephone number list and also displays information such as an alarm. Push buttons 14 are located on the inside of the open cover 13. With the open cover 13 opened, the portable telephone 10 can be used as a telephone for a calling through an antenna 15, but with the open cover 13 unopened, the portable telephone 10 can be used as a telephone when a calling is received. The push buttons 14 can also be used to store and update a telephone number list and to instruct the list to be displayed.

On the other hand, a battery housing section 16 is provided at the bottom of the portable telephone 10. This battery housing section 16 can be removed together with a battery to enable the user to charge the battery without taking it out from the battery housing section 16.

Figure 2:
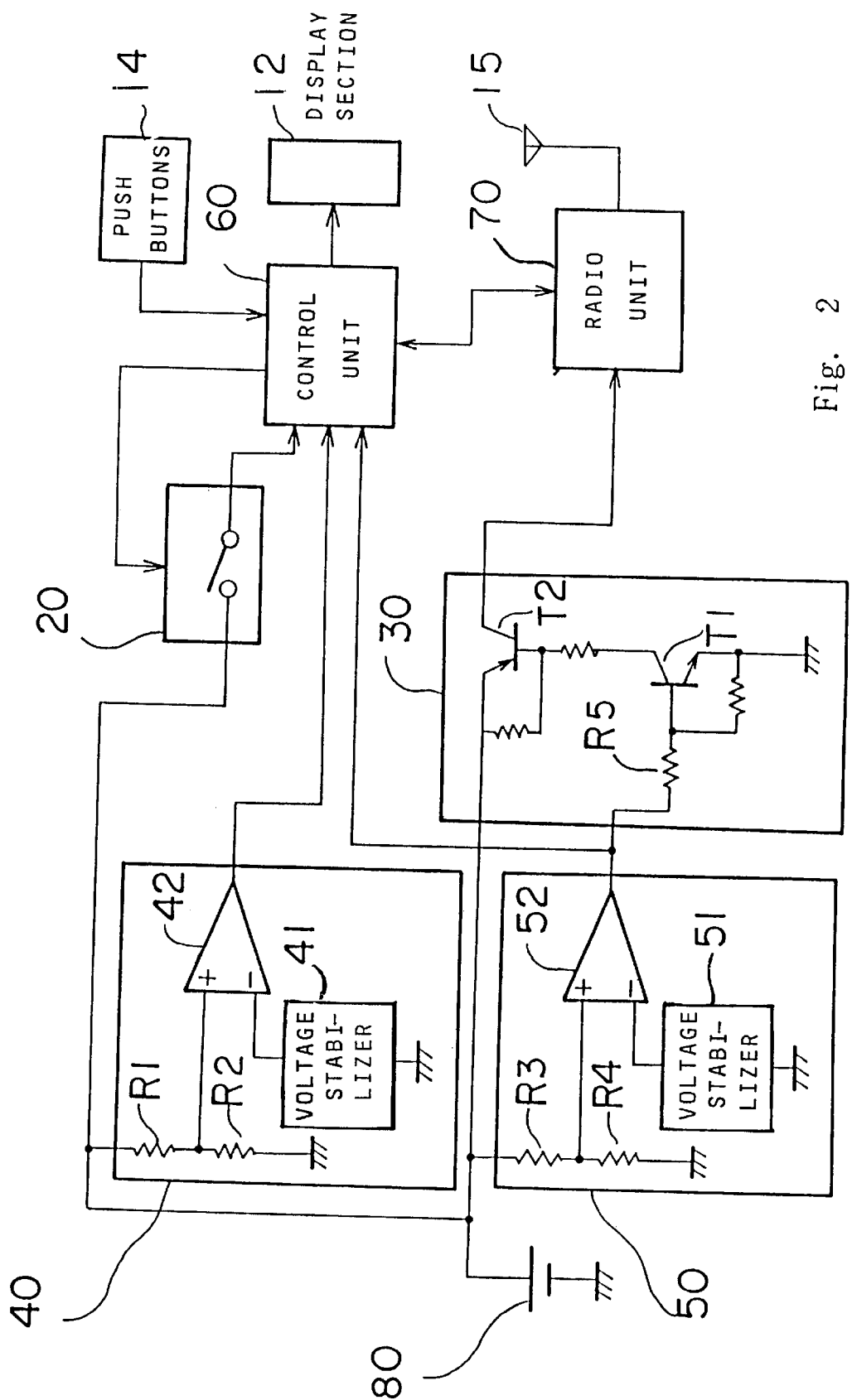
FIG. 2 is a circuit diagram showing the configuration of a power switching unit of a portable telephone according to a first embodiment of the invention.

FIG. 2 is a circuit diagram showing the configuration of a power switching unit of a portable telephone according to a first embodiment of the invention. The embodiment uses a battery 80 as a power source. A nickel-cadmium battery of a relatively large charging capacity is used for the battery 80. From the battery 80, power is supplied through a control disconnection circuit 20 to a control unit 60 and through a communication disconnection circuit 30 to a radio unit 70. The output voltage value of the battery 80 (5V) is always monitored by voltage monitor circuits 40 and 50.

The voltage monitor circuit 40 consists mainly of resistors R1 and R2, a voltage stabilizer 41, and an operational amplifier 42. The resistors R1 and R2 multiply the output voltage value of the battery 80 by R2/(R1+R2). (Assume that R1 and R2 represent the resistance values of the resistors R1 and R2.) The voltage stabilizer 41 uses the supply voltage (5V) finally sent to the control unit 60 and the radio unit 70 to generate a constant reference voltage.

The operational amplifier 42 outputs a voltage Vx to the control unit 60 in response to the difference between the reduced battery voltage and the reference voltage. The voltage Vx is set high when the output voltage of the battery 80 is equal to or greater than the lower limit of voltage Va, at which the control unit 60 can operate; otherwise, the voltage Vx is set low.

The voltage monitor circuit 50 consists mainly of resistors R3 and R4, a voltage stabilizer 51, and an operational amplifier 52. The resistors R3 and R4 multiply the output voltage value of the battery 80 by R4/(R3+R4). (Assume that R3 and R4 represent the resistance values of the resistors R3 and R4.) Like the voltage stabilizer 41, the voltage stabilizer 51 uses the supply voltage (5V) finally sent to the control unit 60 and the radio unit 70 to generate a constant reference voltage.

The operational amplifier 52 outputs a voltage Vy to the control unit 60 and the communication disconnection circuit 30 in response to the difference between the reduced battery voltage and the reference voltage. The voltage Vy is set high when the output voltage of the battery 80 is equal to or greater than the lower limit of voltage Vb, at which the radio unit 70 can operate; otherwise, the voltage Vx is set low.

Figure 3:
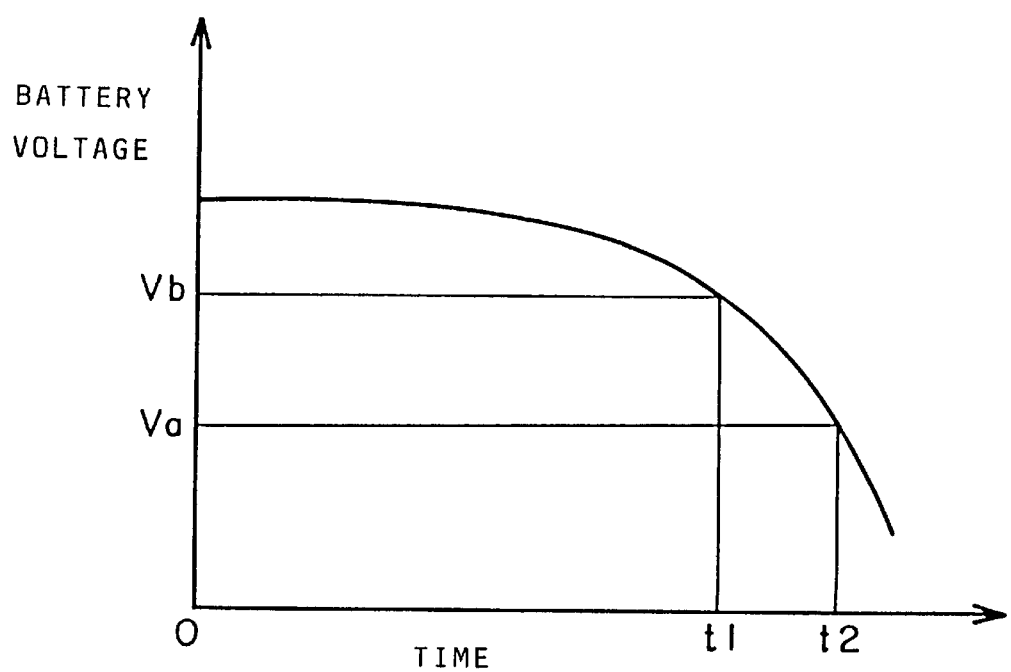
FIG. 3 is a graph showing the time characteristic of battery voltage.

FIG. 3 is a graph showing the time characteristic of voltage of the battery 80 when the portable telephone 10 operates. As seen in the figure, the output voltage of the battery 80 reaches the lower limit of voltage Vb, at which the radio unit 70 can operate at time t1; then at time t2, the output voltage reaches the lower limit of voltage Va, at which the control unit 60 can operate. That is, when the output voltage of the battery 80 drops, first the voltage Vy goes low; then the voltage Vx goes low.

Returning to FIG. 2, at the communication disconnection circuit 30, the output voltage Vy of the voltage monitor circuit 50 is input via a resistor R5 to the base of a transistor T1. When the output voltage of the battery 80 is sufficient and the voltage Vy is high, the transistor T1 operates, thereby operating another transistor T2 for supplying power from the battery 80 to the radio unit 70.

On the other hand, if the output voltage of the battery 80 drops and the voltage Vy goes low, the transistor T1 does not operate, thus the transistor T2 does not operate either. Therefore, power supply from the battery 80 to the radio unit 70 is stopped.

The control unit 60 has the electronic pocket notebook (or system pocket notebook) function which stores data such as telephone numbers and names and other various pieces of information such as calendars for display on the display section 12. The control unit 60 also controls power switching operation, message display, etc. Further, it may also be provided with a function of causing the radio unit to perform call originating operation based on a read-out telephone number.

Figure 4:
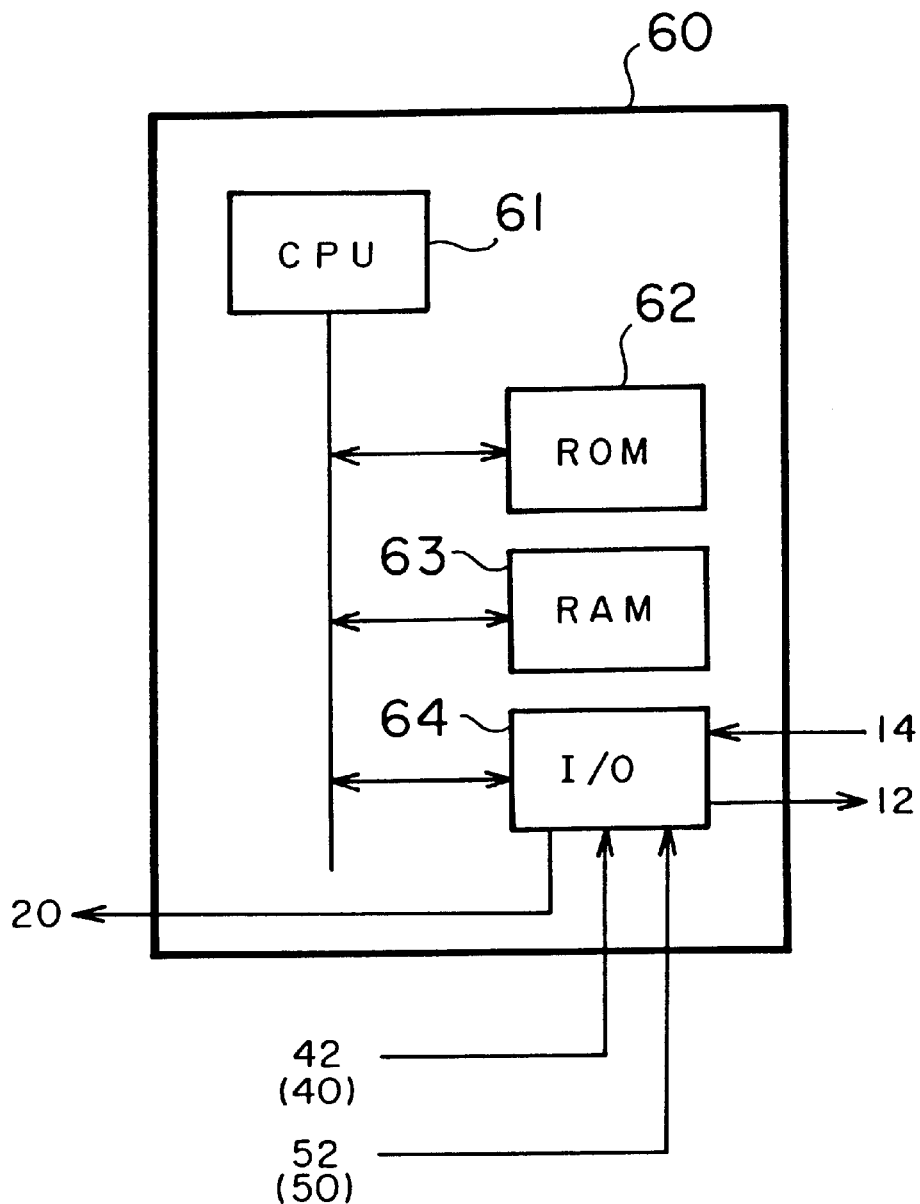
FIG. 4 is a block diagram showing the internal configuration of a control unit.

FIG. 4 shows the internal configuration of the control unit 60. The control unit 60 consists of components such as a CPU 61 which performs electronic pocket notebook function processing and power switching control, a ROM 62 which stores electronic pocket notebook function processing and power switching control programs, a RAM 63 which stores various data pieces such as telephone numbers, and an input/output interface 64 to which the operational amplifier 42 of the voltage monitor circuit 40, the operational amplifier 52 of the voltage monitor circuit 50, the control disconnection circuit 20, the push buttons 14, the display section 12, and others are connected.

Returning to FIG. 2, first, when the output voltage Vy from the voltage monitor circuit 50 goes low, the communication disconnection circuit 30 stops power supply to the radio unit 70, thus the control unit 60 causes the display section 12 to display a communication disable message. Next, when the output voltage Vx from the voltage monitor circuit 40 goes low, the control unit 60 causes the display section 12 to display a prompting message for requesting the user to charge the battery 80, then outputs a control disconnection instruction signal to the control disconnection circuit 20 in the predetermined time after display of the prompting message is started.

The control disconnection circuit 20 has the same configuration as the communication disconnection circuit 30; when the control disconnection instruction signal is input, the control disconnection circuit 20 becomes out of continuity, stopping power supply to the control unit 60. The control disconnection control signal is indicated when the output voltage from the control unit 60 goes low. Normally, high voltage is input to the control disconnection circuit 20 from the control unit 60. Therefore, the control disconnection circuit 20 is normally in a continuity state for supplying power to the control unit 60; when the control disconnection instruction signal which is low is input, the control disconnection circuit 20 becomes out of continuity, stopping power supply to the control unit 60.

Figure 5:
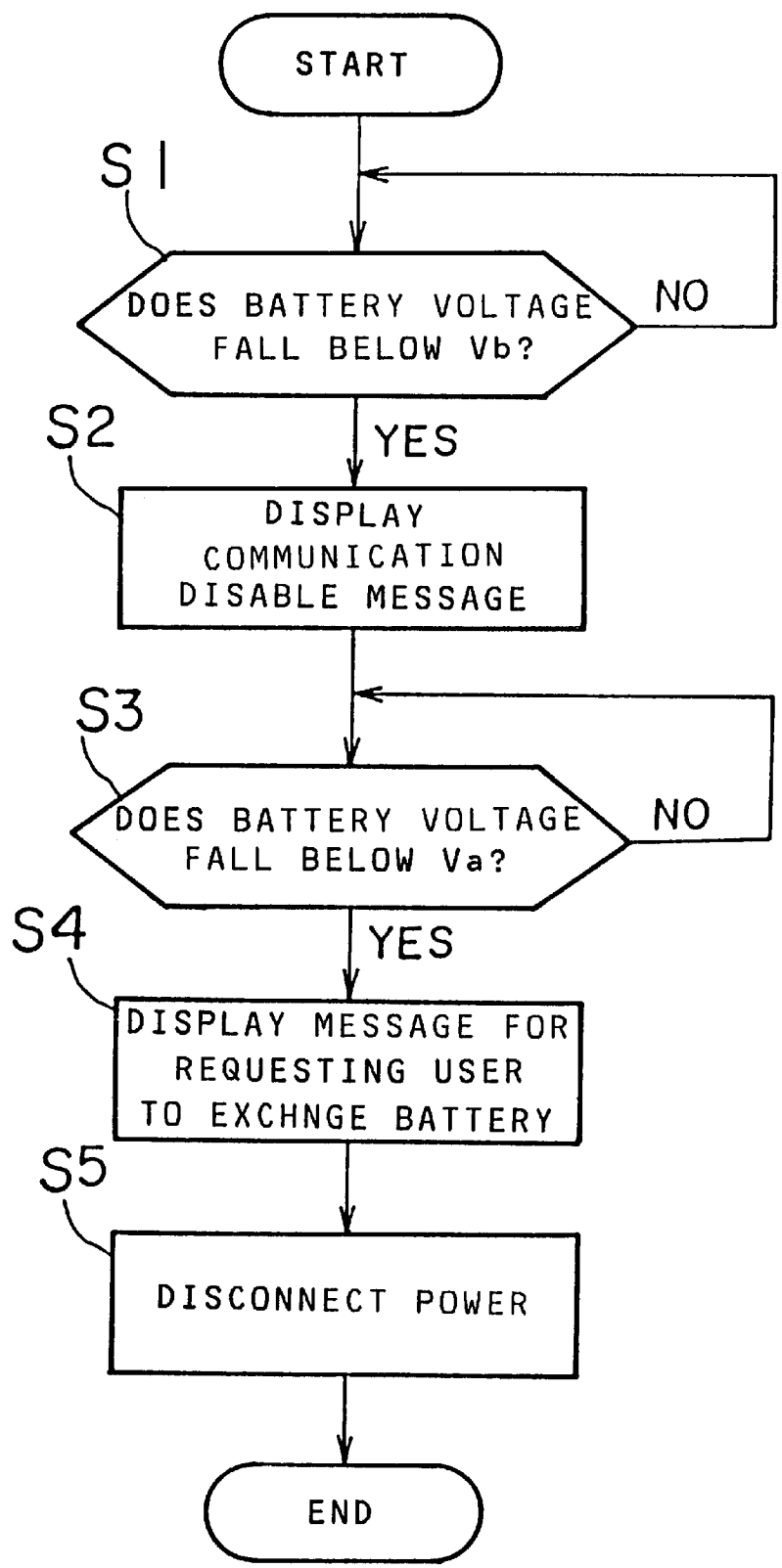
FIG. 5 is a flowchart showing a switching control sequence by a control unit according to a first embodiment of the invention.

FIG. 5 is a flowchart showing a switching control sequence by the control unit 60 according to the first embodiment of the invention.

At step S1, the voltage Vy is checked to see if the output voltage value of the battery 80 falls below Vb. If so, then the control sequence proceeds to step S2; otherwise, step S1 is repeated.

At step S2, the display section 12 is made to display a communication disable message.

At step S3, the voltage Vx is checked to see if the output voltage value of the battery 80 falls below Va. If so, then the control sequence proceeds to step S4; otherwise, step S3 is repeated.

At step S4, the display section 12 is made to display a prompting message for requesting the user to charge the battery 80.

At step S5, in the predetermined time after the output voltage value of the battery 80 falls below Va, a control disconnection instruction signal is output to the control disconnection circuit 20 for stopping power supply to the control unit 60.

The embodiment is designed to stop power supply only to the radio unit 70 if the output voltage value of the battery 80 falls below the lower limit of voltage Vb, at which the radio unit 70 can operate, thus the control unit 60 which consumes low power can be operated. Even if the battery output voltage drops and the portable telephone 60 cannot be used for communication as a telephone, the electronic pocket notebook function can be continued.

The embodiment is also designed to stop power supply to the control unit 60 as well as to the radio unit 70 if the output voltage value of the battery 80 falls below the lower limit of voltage Va, at which the control unit 60 can operate, thus the control unit 60 can be prevented from malfunctioning, etc.

Next, a second embodiment of the invention is described.

Figure 6:
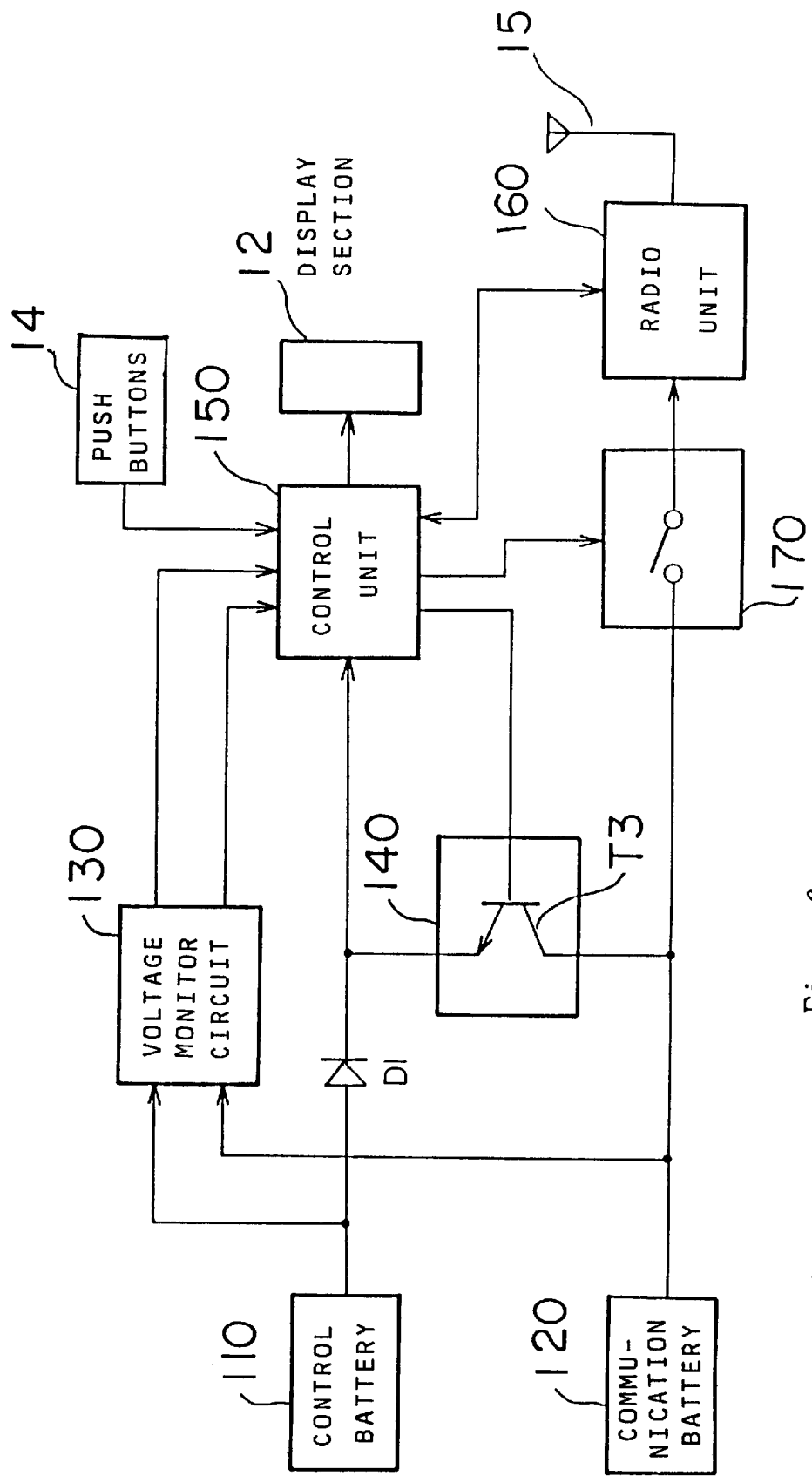
FIG. 6 is a block diagram showing the configuration of a power switching unit of a portable telephone according to a second embodiment of the invention.

FIG. 6 is a block diagram showing the configuration of a power switching unit of a portable telephone according to the second embodiment of the invention. Like the power switching unit according to the first embodiment, the power switching unit according to the second embodiment is contained in the portable telephone 10 shown in FIG. 1. The second embodiment uses power sources of a control battery 110 for supplying power only to a control unit 150 and a communication battery 120 for supplying power normally to a radio unit 160. A nickel-cadmium battery of a relatively large charging capacity is used for the communication battery 120 and a small-sized lithium battery is used for the control battery 110.

Power from the control battery 110 is supplied to the control unit 150 through a diode D1. On the other hand, power from the communication battery 120 is supplied via a power disconnection circuit 170 to the radio unit 160. The output voltage value (5V) of each of the batteries 110 and 120 is always monitored by a voltage monitor circuit 130.

The voltage monitor circuit 130 contains two circuit parts similar to the voltage monitor circuits 40 and 50 used with the first embodiment (FIG. 2) for monitoring output voltages of the batteries 110 and 120. When the output voltage value of the control battery 110 falls below a first predetermined value, the voltage monitor circuit 130 outputs a control voltage drop signal to the control unit 150. The first predetermined value is set based on the lower limit of voltage at which the control unit 150 can be operated accurately. When the output voltage value of the communication battery 120 falls below a second predetermined value, the voltage monitor circuit 130 outputs a communication voltage drop signal to the control unit 150. The second predetermined value is set based on the lower limit of voltage at which the radio unit 160 can be operated accurately.

A power supply circuit 140 and the diode D1 are located between the control and communication batteries 110 and 120. The power supply circuit 140 is a switch circuit made of a transistor T3; when receiving a power supply instruction signal from the control unit 150, the power supply circuit 140 supplies power from the communication battery 120 to the control unit 150. In this case, the the time, the control unit 150 causes the display section 12 to display a communication disable message.

Figure 7:
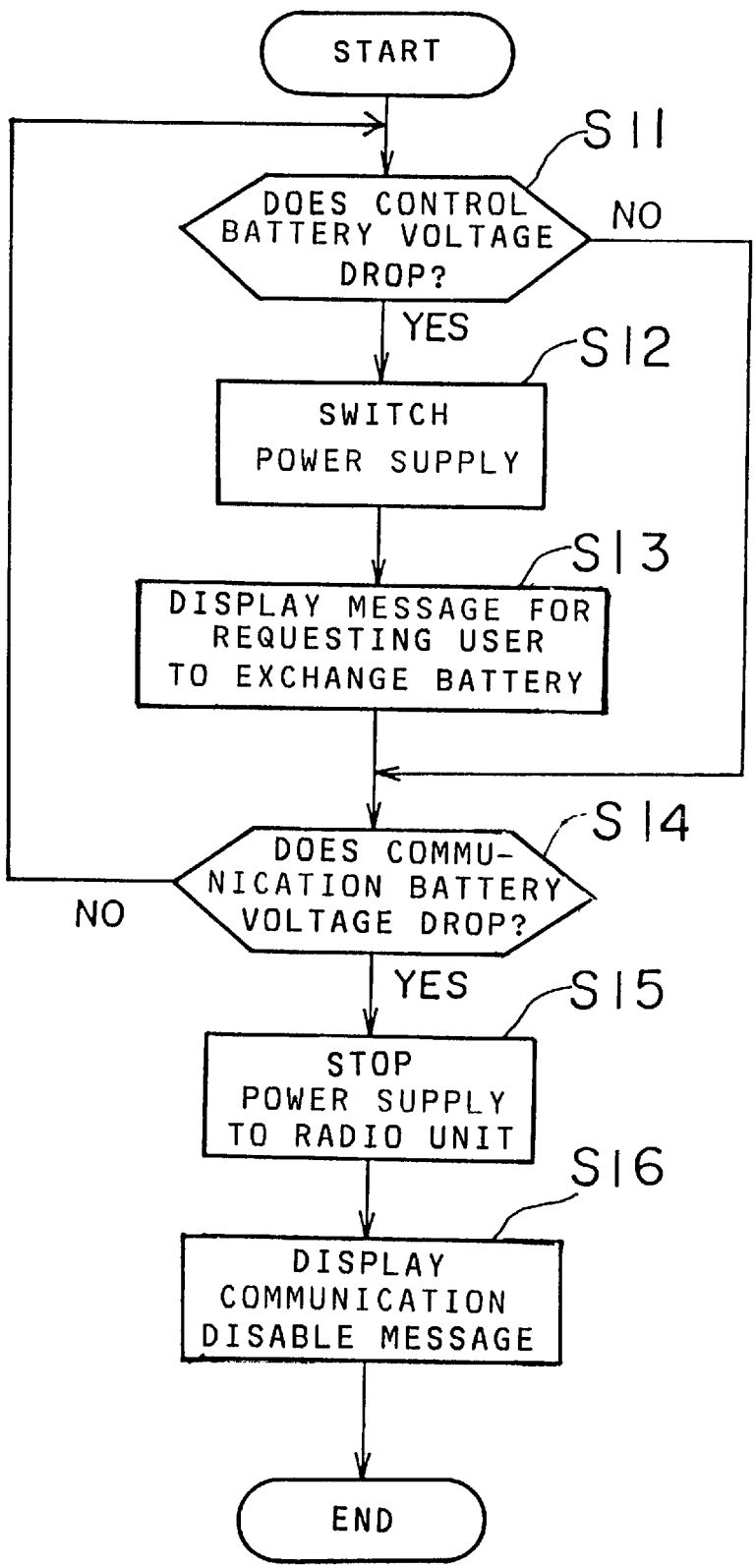
FIG. 7 is a flowchart showing a power switching control sequence by a control unit according to the second embodiment of the invention.

FIG. 7 is a flowchart showing a switching control sequence by the control unit 150 according to the second embodiment of the invention.

At step S11, input of a control voltage drop signal from the voltage monitor circuit 130 is checked to see if the output voltage value of the control battery 110 drops. If the battery voltage drops, the control sequence proceeds to step S12; otherwise, the control sequence jumps to step S14.

At step S12, a power supply instruction signal is sent to the power supply circuit 140 for supplying power from the communication battery 120 to the control unit 150.

At step S13, the display section 12 is made to display a prompting message for requesting the user to exchange the control battery 110 for a new one.

At step S14, input of a communication voltage drop signal from the voltage monitor circuit 130 is checked to see if the output voltage value of the communication battery 120 drops. If the battery voltage drops, the control sequence proceeds to step S15; otherwise, the control sequence is returned to step S11.

At step S15, a power disconnection instruction signal is sent to the power disconnection circuit 170 for stopping power supply to the radio unit 160.

At step S16, the display section 12 is made to diode D1 prevents current from flowing from the communication battery 120 to the control battery 110.

A power disconnection circuit 170 is a switch circuit made of a transistor like the power supply circuit 140 or mechanical switch means such as a relay. When receiving a power disconnection instruction signal from the control unit 150, the power disconnection circuit 170 stops power supply to the radio unit 160.

The configuration of the control unit 150 is similar to that of the control unit 60 used with the first embodiment (FIG. 2). When the output voltage value of the control battery 110 drops and a control voltage drop signal is received from the voltage monitor circuit 130, the control unit 150 outputs a power supply instruction signal to the power supply circuit 140. Then, power is supplied from the communication battery 120 to the control unit 150 for continuing the operation of the control unit 150. At the time, the control unit 150 causes a display section 12 to display a prompting message for requesting the user to exchange the control battery 110 for a new one.

When the output voltage value of the communication battery 120 drops and a communication voltage drop signal is received from the voltage monitor circuit 130, the control unit 150 sends a power disconnection instruction signal to the power disconnection circuit 170. Then, the power disconnection circuit 170 stops power supply from the communication battery 120 to the radio unit 160. At display a communication disable message.

The second embodiment is designed to supply power from the communication battery 120 to the control unit 150 if the output voltage value of the control battery 110 drops, thus the control unit 150 can always be operated.

The second embodiment is also designed to stop power supply from the communication battery 120 to the radio unit 160 if the output voltage value of the communication battery 120 drops, thus abnormal operation of the radio unit 160 caused by the voltage drop can be prevented.

Next, a third embodiment of the invention is described.

Figure 8:
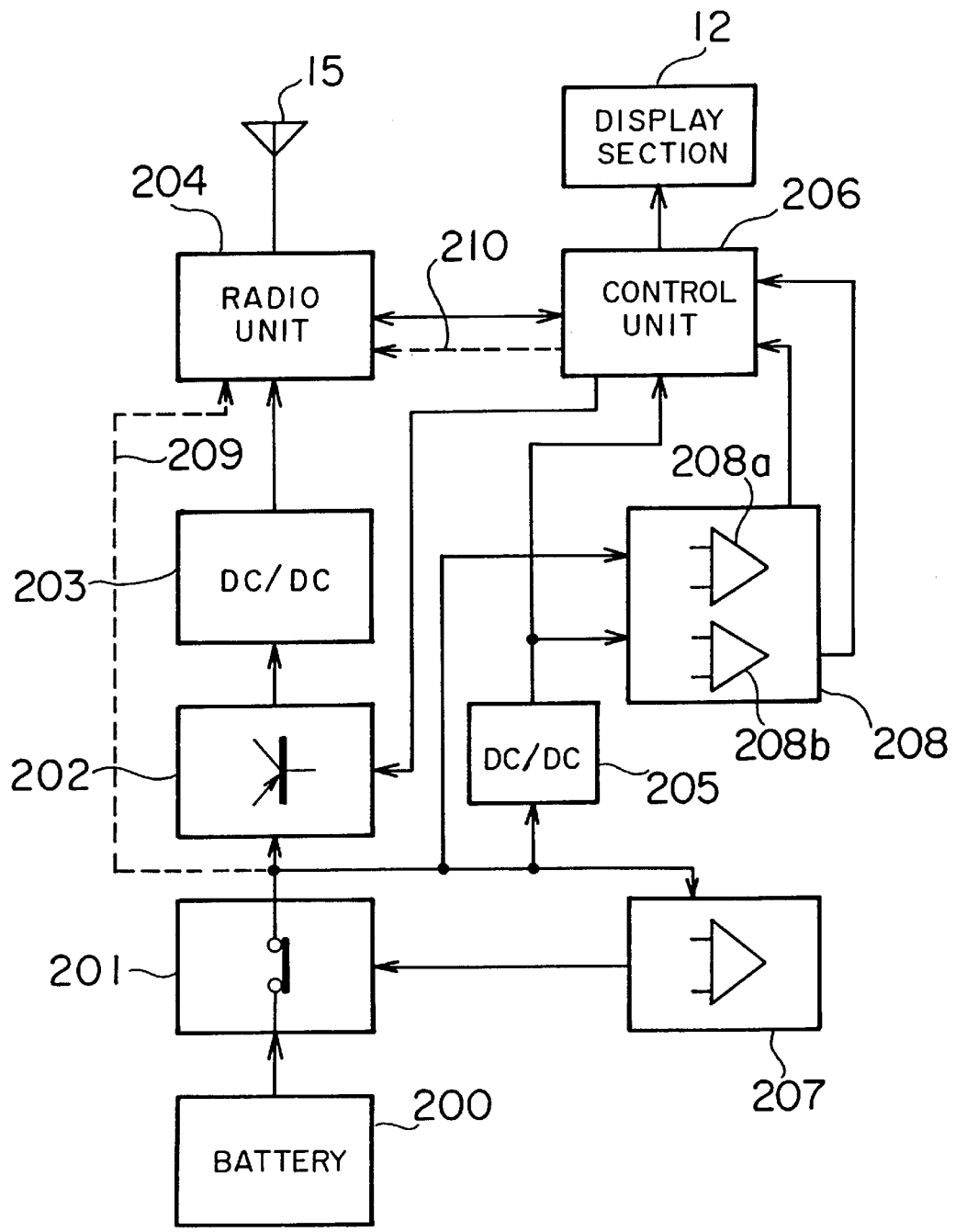
FIG. 8 is a block diagram showing the configuration of a power switching unit of a portable telephone according to a third embodiment of the invention.

FIG. 8 is a block diagram showing the configuration of a power switching unit of a portable telephone according to the third embodiment of the invention. Like the power switching unit according to the first embodiment, the power switching unit according to the third embodiment is contained in the portable telephone 10 shown in FIG. 1. The third embodiment uses a battery 200 as a power source.

Power from the battery 200 is supplied to a radio unit 204 via a switching circuit 201, a switching circuit 202, and a voltage transformation circuit 203 in order, and is also supplied to a control unit 206 via the switching circuit 201 and a voltage transformation circuit 205 in order. The switching circuit 201 is made of mechanical switch means such as a relay; when receiving a power disconnection signal from a voltage monitor circuit 207 described below, the switching circuit 201 is opened. The switching circuit 202 consists of a transistor circuit; when receiving a communication shutoff signal from the control unit 206, the switching circuit 202 becomes out of continuity. The voltage transformation circuit 203 steps down normal supply voltage 6V received from the battery 200 to normal operating voltage of the radio unit 220, 5V. When the supply voltage from the battery 200 exceeds 5V, the voltage transformation circuit 205 steps it down to 5V; when the supply voltage falls below 5V, automatically the circuit 205 steps it up to 5V so as to always supply normal operating voltage of the control unit 240, 5V, to the control unit 240. The minimum input voltage from the battery 200 that can be stepped up to 5V by the voltage transformation circuit 205 is 1V.

A voltage monitor circuit 208 consists of two operational amplifiers 208a and 208b, each of which serves as a comparator. The operational amplifier 208a monitors output voltage of the battery 200 to the radio unit 204 at the output stage of the switching circuit 201; when the output voltage of the battery 200 falls below 5V, the operational amplifier 208a outputs a low voltage detection signal to the control unit 206. The voltage 5V corresponds to the input voltage of the voltage transformation circuit 203 required to provide the lower limit voltage (about 4.2V) at which the radio unit 204 can operate. The operational amplifier 208b monitors supply voltage to the control unit 206 at the output stage of the voltage transformation circuit 205; when the supply voltage falls below the lower limit voltage 4.2V at which the control unit 206 can operate, the operational amplifier 208b outputs a reset signal to the control unit 206.

When receiving the low voltage detection signal, the control unit 206 sends a communication shutoff signal to the switching circuit 202 to place the switching circuit 202 out of continuity for shutting off power supply to the radio unit 204. When receiving the reset signal, the control unit 206 is reset for preventing the internal CPU from being upset.

The voltage monitor circuit 207, which consists of an operational amplifier as a comparator, monitors input voltage of the voltage transformation circuit 205 at the output stage of the switching circuit 201; when the input voltage falls below 1V, the voltage monitor circuit 207 outputs a power shutoff signal to the switching circuit 201. The voltage 1V is the lower limit of input voltage from which the voltage transformation circuit 205 can generate output voltage 5V.

The control unit 206 and the voltage monitor circuit 207 have the same configurations as the control unit 60 and the voltage monitor circuit 40 used with the first embodiment (FIG. 2) respectively. The voltage monitor circuit 208 has the same configuration as the voltage monitor circuit 130 used with the second embodiment (FIG. 6).

Figure 9:
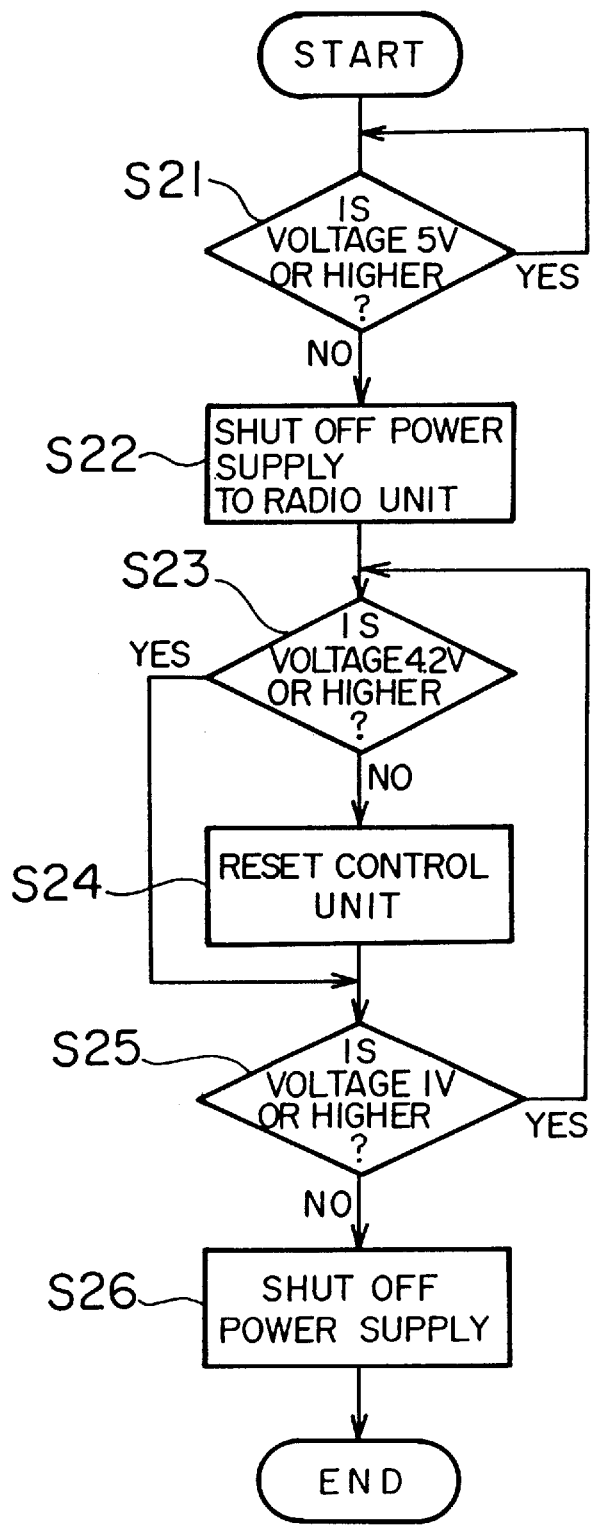
FIG. 9 is a flowchart showing a power switching control sequence by a control unit according to the third embodiment of the invention.

FIG. 9 is a flowchart showing a switching control sequence according to the third embodiment of the invention.

At step S21, the voltage monitor circuit 208 determines whether or not the output voltage of the battery 200 to the radio unit 204 is 5V or higher. If it is 5V or higher, step S21 is repeated; if the voltage is lower than 5V, the voltage monitor circuit 208 outputs a low voltage detection signal to the control unit 206, and the control sequence proceeds to step S22.

At step S22, the control unit 206 sends a communication shutoff signal to the switching circuit 202 to place the switching circuit 202 out of continuity for shutting off power supply to the radio unit 204. Then, the radio unit 204 does not work, but the voltage transformation circuit 205 steps up voltage to enable the control unit 206 to continue operation. Therefore, the electronic pocket notebook function of the control unit 206 is effective; various data pieces can be stored and displayed on a display section 12 although the output voltage of the battery 200 drops.

At step S23, the voltage monitor circuit 208 determines whether or not the voltage supplied to the control unit 206 is the lower limit voltage 4.2 V or higher at which the control unit 206 can operate. If it is 4.2V or higher, the control sequence jumps to step S25; if the voltage is lower than 4.2V, the voltage monitor circuit 208 outputs a reset signal to the control unit 206, and the control sequence proceeds to step S24.

At step S24, when receiving the reset signal, the control unit 206 is reset.

At step S25, the voltage monitor circuit 208 determines whether or not the input voltage to the voltage transformation circuit 205 is 1V or higher. If it is 1V or higher, the control sequence returns to step S23; if the voltage is lower than 1V, the voltage monitor circuit 208 outputs a power shutoff signal to the switching circuit 201.

At step S26, when receiving the power shutoff signal, the switching circuit 201 is opened to shut off power supply from the battery 200 to the radio unit 204, the control unit 206, etc.

In the third embodiment shown in FIG. 8, the switching circuit 202 and the voltage transformation circuit 203 may be removed for direct connection of the switching circuit 201 to the radio unit 204 (broken line arrow 209) wherein the control unit 206, upon reception of a low voltage detection signal from the voltage monitor circuit 208, may control the radio unit (broken line arrow 210) to save power of the radio unit 204 and stop the communication function of the same.

Although it is possible that the voltage transformation circuit 203 steps up voltage like the voltage transformation circuit 208, it is not preferable that the voltage transformation circuit 203 for the radio unit 204 steps up voltage because output of a voltage transformation circuit which steps up voltage generally contains much noise.

In the third embodiment, the voltage transformation circuit 205 which can step up voltage is provided between the control unit 206 and the battery 200, thus even if the supply voltage drops and the radio unit 204 becomes unavailable, the control unit 206 can be worked until the supply voltage reaches the lower limit 1V at which the voltage transformation circuit 205 can output stepped-up voltage.

Next, a fourth embodiment of the invention is described.

Figure 10:
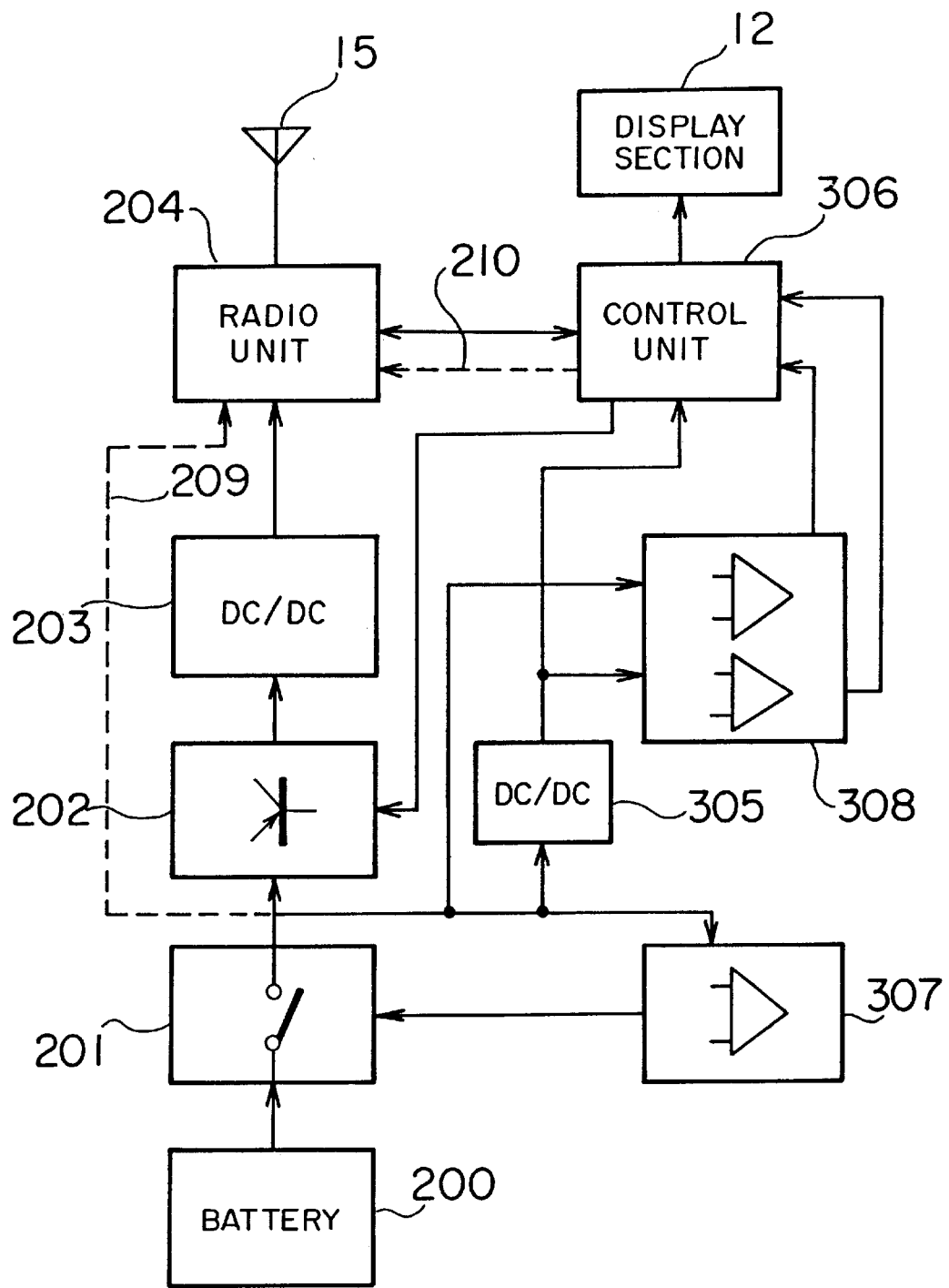
FIG. 10 is a block diagram showing the configuration of a power switching unit of a portable telephone according to a fourth embodiment of the invention.

FIG. 10 is a block diagram showing the configuration of a power switching unit of a portable telephone according to the fourth embodiment of the invention. The fourth embodiment is characterized by the normal operating voltage of a control unit 306 which is 3V lower than that of a radio unit 204, 5V, but basically the fourth embodiment has the same configuration as the third embodiment. In the description to follow, the same parts as those shown in FIG. 8 are designated by the same reference numerals in FIG. 10, and will therefore not be discussed again.

The voltage transformation circuit 305 steps down input voltage 6V from a battery 200 to 3V. Even if the input voltage drops from 6V, the voltage transformation circuit 305 continues to output 3V, but if the input voltage falls below 3.2V, the circuit 305 becomes unable to output 3V. Unlike the voltage transformation circuit 205 used with the third embodiment, the voltage transformation circuit 305 does not have the voltage step-up function.

The voltage monitor circuit 308 monitors output voltage of the battery 200 to the radio unit 204, and if the output voltage of the battery 200 falls below 5V, it outputs a low voltage detection signal to the control unit 306, as with the voltage monitor circuit 208 of the third embodiment. Also, the voltage monitor circuit 308 monitors voltage supplied to the control unit 306, and if the voltage falls below the operating voltage of the control unit 306, 3V, it outputs a reset signal to the control unit 306.

Like the control unit 206 of the third embodiment, when receiving the low voltage detection signal, the control unit 306 sends a communication shutoff signal to a switching circuit 202 to place the switching circuit 202 out of continuity for shutting off power supply to the radio unit 204. When receiving the reset signal, the control unit 306 is reset for preventing the internal CPU from being upset.

A voltage monitor circuit 307 monitors input voltage of the voltage transformation circuit 305; when the input voltage falls below 3.2 V, the voltage monitor cir-307 outputs a power shutoff signal to a switching circuit 201. The voltage 3.2V is the lower limit of input voltage from which the voltage transformation circuit 305 can generate output voltage 3V as described above.

Figure 11:
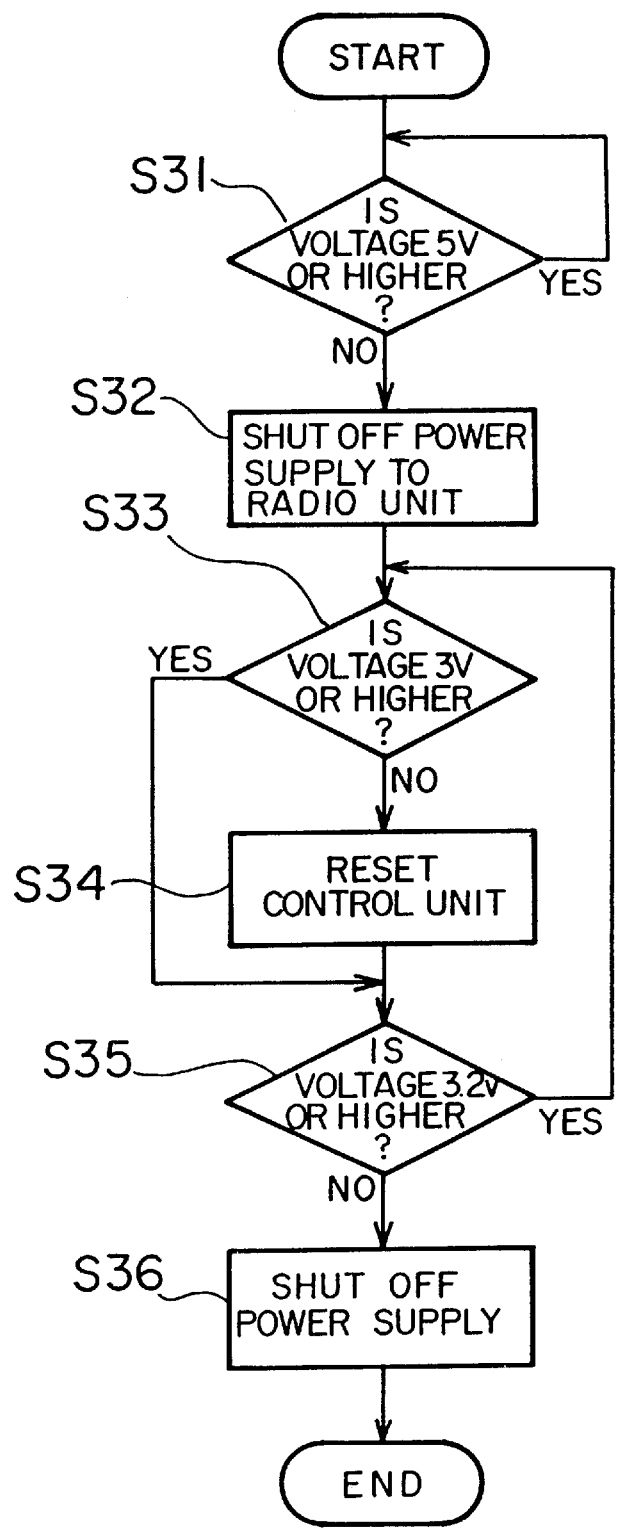
FIG. 11 is a flowchart showing a power switching control sequence by a control unit according to the fourth embodiment of the invention.

FIG. 11 is a flowchart showing a switching control sequence according to the fourth embodiment of the invention.

At step S31, the voltage monitor circuit 308 determines whether or not the output voltage of the battery 200 to the radio unit 204 is 5V or higher. If it is 5V or higher, step S31 is repeated; if the voltage is lower than 5V, the voltage monitor circuit 308 outputs a low voltage detection signal to the control unit 306, and the control sequence proceeds to step S32.

At step S32, the control unit 306 sends a communication shutoff signal to the switching circuit 202 to place the switching circuit 202 out of continuity for shutting off power supply to the radio unit 204. Then, the radio unit 204 does not work, but power is supplied to the control unit 306 which can then continue operation. Therefore, the electronic pocket notebook function of the control unit 306 is effective; various data pieces can be stored and displayed on a display section 12 although the output voltage of the battery 200 drops.

At step S33, the voltage monitor circuit 308 determines whether or not the voltage supplied to the control unit 306 is the operating voltage of the control unit 36, 3V, or higher. If it is 3V or higher, the control sequence jumps to step S35; if the voltage is lower than 3V, the voltage monitor circuit 308 outputs a reset signal to the control unit 306, and the control sequence proceeds to step S34.

At step S34, when receiving the reset signal, the control unit 306 is reset.

At step S35, the voltage monitor circuit 308 determines whether or not the input voltage to the voltage transformation circuit 305 is 3.2V or higher. If it is 3.2V or higher, the control sequence returns to step S33; if the voltage is lower than 3.2V, the voltage monitor circuit 308 outputs a power shutoff signal to the switching circuit 201.

At step S36, when receiving the power shutoff signal, the switching circuit 201 is opened to shut off power supply from the battery 200 to the radio unit 204, the control unit 306, etc.

As in the fourth embodiment, even when the operating voltage of the control unit 306 is lower than that of the radio unit 204, if the voltage transformation circuit 305 which steps down voltage is provided between the control unit 306 and the battery 200 to cover the operating voltage of the control unit 306 and power supply to the radio unit 204 is shut off in response to the output voltage of the battery 200, the operation of the control unit 306 can be continued even when the supply voltage drops.

In the fourth embodiment shown in FIG. 10, as in the third embodiment, the switching circuit 202 and the voltage transformation circuit 203 may be removed for direct connection of the switching circuit 201 to the radio unit 204 (broken line arrow 209) wherein the control unit 306, upon reception of a low voltage detection signal from the voltage monitor circuit 308, may control the radio unit (broken line arrow 210) to save power of the radio unit 204 and stop the communication function of the same.

Instead of the voltage monitor circuits 207, 208, 307, and 308 used with the third and fourth embodiments, digital voltage data into which analog data has been converted may be input to the control unit 206 or 306 for judgment of the voltage value to switch power supply.

Each of the first to fourth embodiments assumes that the control unit contains the electronic pocket notebook function, but the control unit may contain a simple data storage function of storing and reading out data such as telephone numbers, in which case it can be used for a redialing function which stores the previously dialed telephone number and reads it out for redialing.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be restored to, falling within the scope of the invention in the appended claims and their equivalents.

What is claimed is:

1. A portable telephone comprising:

a radio unit for providing a radio communication function;

a control unit, being operable with a lower power than said radio unit, for controlling operation of said radio unit and providing a storage function which stores a list of names and telephone numbers; and a power switching unit, operably coupled to said radio unit and said control unit, for supplying power to the control unit and the radio unit, wherein said power switching unit comprises:

a battery for generating power for the control unit and the radio unit, first voltage monitor means for monitoring a supply voltage of said battery to output a first voltage drop signal when said supply voltage falls below a first lower limit of voltage at which said radio unit can work, communication disconnection means for receiving said first voltage drop signal and for stopping power supply to said radio unit upon reception of said first voltage drop signal, wherein upon reception of said first voltage drop signal by said communication disconnection means and upon stopping by said communication disconnection means of said power supply to said radio unit, said communication disconnection means for said control unit continues to at least provide said storage function which stores said list of names and said telephone numbers, voltage adjustment means for adjusting voltage supplied to the control unit from said battery to a predetermined operating voltage of said control unit for supplying said predetermined operating voltage to only said control unit and for operating said control unit even if said radio unit becomes inoperable, second voltage monitor means for monitoring voltage supplied to said voltage adjustment means to output a power shutoff signal when said voltage falls below a second lower limit of voltage at which said voltage adjustment means can work, and power shutoff means for stopping power supply to said control unit and said radio unit upon reception of said power shutoff signal, said power switching unit further including third voltage monitor means for monitoring output voltage from said voltage adjustment means for outputting a reset signal when said output voltage falls below a third predetermined value, wherein said control unit receives said reset signal and is reset upon reception of said reset signal to thereby prevent said control unit from being upset.

2. The portable telephone as claimed in claim 1, wherein said third predetermined value is a third lower limit of voltage at which said control unit can work, said third predetermined value being less than said first lower limit of voltage.

3. A portable telephone comprising:

a radio unit for providing a radio communication function;

a control unit, being operable with a lower power than said radio unit, for controlling operation of said radio unit and providing storage function which stores a list of names and telephone numbers; and a power switching unit, operably coupled to said radio unit and said control unit, for supplying power to the control unit and the radio unit, wherein said power switching unit comprises:

a battery for generating power for the control unit and the radio unit, a first voltage monitor means for monitoring a supply voltage of said battery to output a first voltage drop signal when said supply voltage falls below a first lower limit of voltage at which said radio unit can work, and communication disconnection means for receiving said first voltage drop signal and for stopping power supply to said radio unit upon reception of said first voltage drop signal, wherein upon reception of said first voltage drop signal by said communication disconnection means and upon stopping by said communication disconnection means of said power supply to said radio unit, said communication disconnection means for said control unit continues to at least provide said storage function which stores said list of names and said telephone numbers, voltage adjustment means for adjusting voltage supplied to the control unit from said battery to a predetermined operating voltage of said control unit for supplying said predetermined operating voltage to only said control unit and for operating said control unit even if said radio unit becomes inoperable, second voltage monitor means for monitoring voltage supplied to said voltage adjustment means to output a power shutoff signal when said voltage falls below a second lower limit of voltage at which said voltage adjustment means can work, and power shutoff means for stopping power supply to said control unit and said radio unit upon reception of said power shutoff signal, said power switching unit further including third voltage monitor means for monitoring output voltage from said voltage adjustment means for outputting a reset signal when said output voltage falls below a third predetermined value, wherein said control unit receives said reset signal and is reset upon reception of said reset signal to thereby prevent said control unit from being upset.

* * * * *